United States Patent

Trembley

[15] 3,698,278
[45] Oct. 17, 1972

[54] NUT MEMBER
[72] Inventor: William H. Trembley, Granada Hills, Calif.
[73] Assignee: VSI Corporation
[22] Filed: March 15, 1971
[21] Appl. No.: 124,290

[52] U.S. Cl. .................. 85/70, 85/77, 151/41.73, 151/41.74
[51] Int. Cl. ............................ F16b 13/06
[58] Field of Search............151/41.72, 41.73, 41.74; 85/70, 71, 72, 77, 78; 285/222; 29/522, 523

[56] References Cited

UNITED STATES PATENTS

| | | | |
|---|---|---|---|
| 2,150,361 | 3/1939 | Chobert | 85/77 |
| 2,195,029 | 3/1940 | Hathorn | 85/72 |
| 2,369,670 | 2/1945 | Gookin | 85/77 |
| 2,553,236 | 5/1951 | Bratfisch | 85/70 |
| 2,759,082 | 8/1956 | Rea | 85/77 |
| 3,131,743 | 5/1964 | Hinkle | 151/41.74 |
| 3,175,795 | 3/1965 | Adams | 151/41.74 |
| 3,180,387 | 4/1965 | Dzus et al. | 151/41.73 |
| 3,537,499 | 11/1970 | Dey et al. | 151/41.76 |

FOREIGN PATENTS OR APPLICATIONS

| | | | |
|---|---|---|---|
| 163,108 | 5/1955 | Australia | 85/78 |

*Primary Examiner*—Marion Parsons, Jr.
*Attorney*—Sokolski & Wohlgemuth

[57] ABSTRACT

A hollow nut assembly for engagement with a plate having a receiving hole therethrough, the assembly including a nut member, a deformable sleeve affixed to the nut having a generally circular inner diameter having at least three radially protruding lobes integrally formed thereon, and a pulling stem in said sleeve having an outer diameter sufficient to cause radial outer movement of the lobes when the stem is pulled through the sleeve.

12 Claims, 12 Drawing Figures

INVENTOR
WILLIAM H. TREMBLEY
BY
SOKOLSKI & WOHLGEMUTH
ATTORNEYS

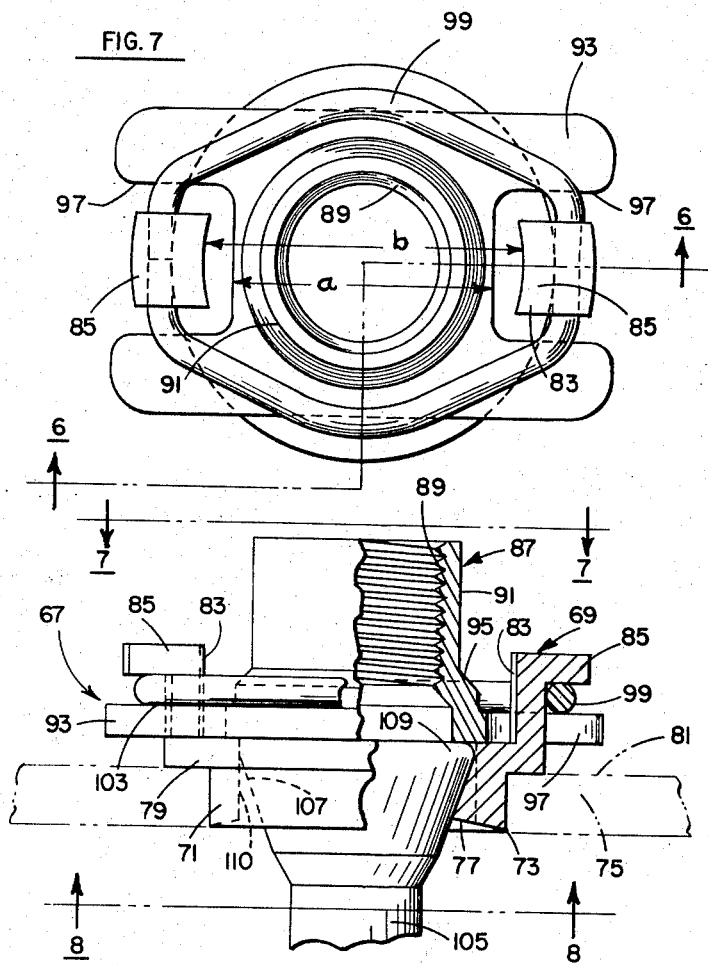
FIG. 7
FIG. 6
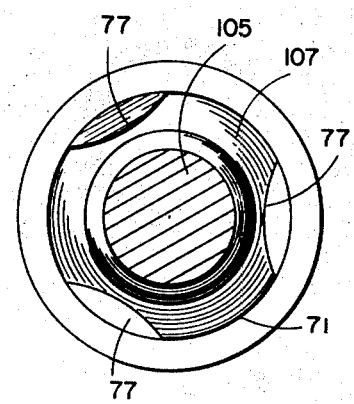
FIG. 8
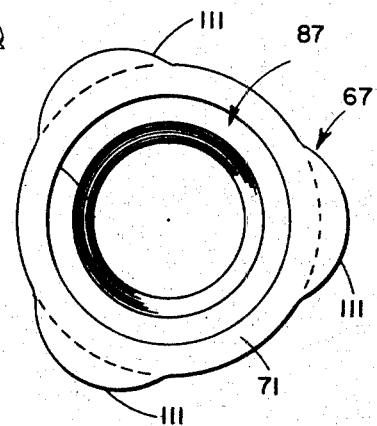
FIG. 10
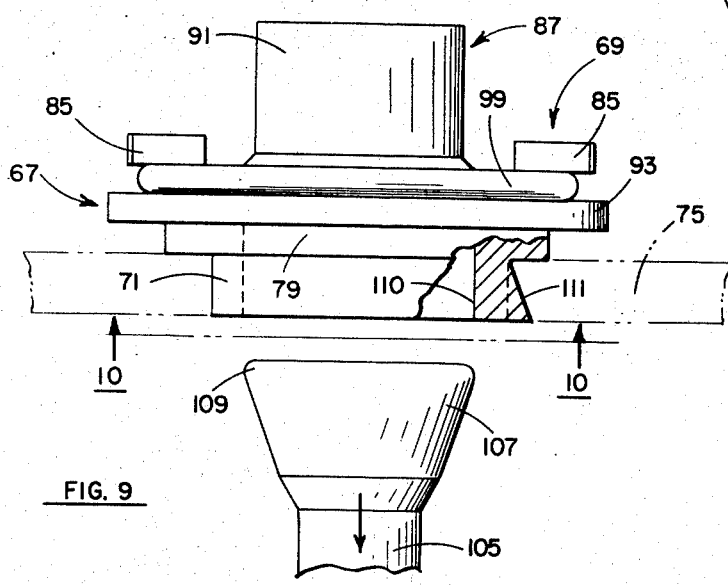
FIG. 9
INVENTOR
WILLIAM H. TREMBLEY
BY
SOKOLSKI & WOHLGEMUTH
ATTORNEYS

NUT MEMBER

BACKGROUND OF THE INVENTION

Nut members, useful in various fastener applications, are well known for disposition in holes provided in work pieces to which a member is desired to be fastened. In the installation process, a common form of such a nut member in the past, was first disposed in the hole provided. A separate pulling mandrel threadably engaged the internal threads of the nut member. Pulling on the mandrel served to crimp a portion of the outer wall of the nut member about the work piece and secure it thereto. Various problems result from this conventional approach which is particularly useful for blind hole applications where the nut member is inserted through the hole and the mandrel is pulled outwardly from the exposed surface. The pulling mandrel places extreme loads on the threads of the nut often leading to damage thereof. Additionally, the relative diameter of the hole in the work piece to the outer diameter of the portion of the nut inserted within the hole must be carefully controlled. In other words, the hole in the work piece must be to close tolerances. The reason for this is that it is not desirable to have the nut member rotate when used to secure a male portion of a fastener. Further, even with fairly precise control of the hole dimensions, it was often impossible to prevent such rotation of the nut element. To counteract this problem notching of the hole to engage a lug on the underside of the head is often employed. This, in many cases, served to prevent the practical utilization of the element or severely limited its use due to generation of stress risers at the notch.

Another element often used as part of a fastener for securing members to a work piece surface is known as a plate nut. This is, in effect, a fixed or floating nut member which has a degree of freedom within a hole provided in a work piece so as to allow adjustment of its position to the member being secured to the work piece. The floating plate nut is comprised of a plate and a separate nut which can move relative to the plate. In the past, the plate in which the nut floats, or is allowed to move, was riveted to the work piece surface since it must remain stationary relative to the nut element. Normally, this required three holes to be pre-drilled into the work piece, two for the rivet element and one for engagement of the nut member. This is, obviously, a very time consuming procedure, thus adding significantly to the cost of the utilization of plate nut elements.

SUMMARY OF THE INVENTION

Briefly, the herein invention comprises the utilization of at least three lobe members integrally formed and extending radially from the diameter of a hollow nut assembly in the region adjacent the hole in the work piece in which it is to be disposed. A pulling mandrel is associated with the nut assembly, the pulling mandrel having an enlarged diameter along a portion thereof sufficient to force the lobes radially outward causing the outer circumference of the nut member to expand and tightly engage the hole provided in the work piece.

A typical nut assembly of one embodiment of the herein invention comprises a nut member which will receive a male member of a fastener and a deformable sleeve extending from the nut member. This assembly is installed from one side of the work piece, i.e., it is a blind installation. At least a portion of the sleeve is inserted in a hole provided in the work piece. At the portion of the sleeve inserted in the hole of the work piece, there is formed at least three radially protruding lobes. The lobes may be formed inwardly on said sleeve or outwardly about the circumference of the sleeve. Disposed within the sleeve and affixed thereto is a pulling stem having an outer diameter larger than the effective inner diameter of the sleeve. When the pulling stem is pulled with a suitable tool in a direction opposite from that of the nut member, a thin wall portion of the sleeve distends the internal diameter to a cylinder. At a predetermined level, the stem breaks from the nut assembly and is pulled therethrough, at which point it causes the lobes of the sleeve to expand radially outward such that the outer circumference of the sleeve portion adjacent the work piece is enlarged to tightly engage the work piece about the hole therein. The expansion of the lobes, as mentioned above, when the stem is within therethrough, causes a tight locking of the sleeve portion withing the hole of the work piece eliminating any potential of rotation of the element when utilized. Expansion of outwardly extending lobes into the work piece causes a cold working of the material of the work piece in this immediate area which improves the overall fatigue strength of the work piece.

In a rivetless plate nut member of the invention, which requires access to both sides of the work piece, a separate plate is provided having a cylindrical hollow wall or sleeve portion which is seated within a hole provided in the work piece. This sleeve has at least three lobes formed thereon in the same manner as described with regard to the nut member mentioned above. A separate nut member is provided having a base portion in sliding engagement with a surface of the plate member. A separate spring element can be used to secure the nut member to the plate element while allowing a degree of sliding movement of the nut relative to the fixed plate. A pulling stem is disposed within the plate member having a gradually tapered outer circumference sufficient to force radial expansion of the lobe members when the stem is pulled through the sleeve in a direction opposite from that of the nut member. The radial expansion of the outer wall of the cylindrical wall portion of the sleeve within the hole of the work piece causes sufficient engagement between the two so that the plate is relatively secured to the work piece without the requirement of rivets or other means of attachment. It is believed that the invention will be better understood from the following detailed description and drawings in which:

BRIEF DESCRIPTION OF THE DRAWINGS

FIG. 6 is an elevational, partially sectioned pictorial representation of a floating plate nut embodiment of the invention.

FIG. 7 is a top view taken along line 7—7 of FIG. 6.

FIG. 8 is a sectional view taken along line 8—8 of FIG. 6.

FIG. 9 is an elevational, partially sectioned pictorial representation of a fully installed plate nut of the invention.

FIG. 10 is a bottom view taken along line 10—10 of FIG. 9.

DESCRIPTION OF THE PREFERRED EMBODIMENTS

Figure 1:
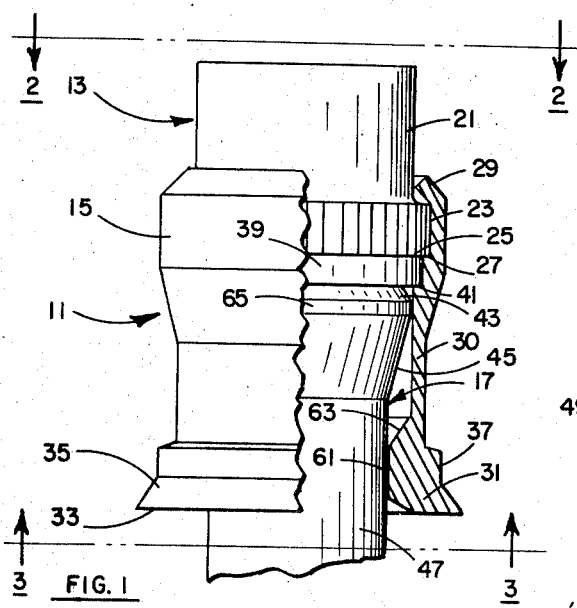
FIG. 1 is an elevational, partially sectioned pictorial representation of a nut member of the invention.
Figure 4:
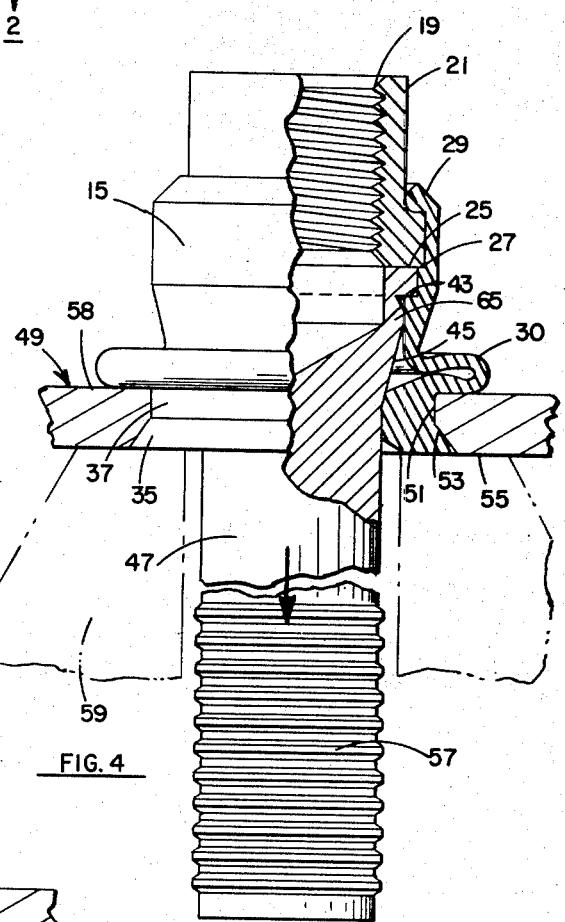
FIG. 4 is an elevational, partially sectioned pictorial representation of a partially installed nut member.

Turning now to FIGS. 1 and 4 there is seen a nut assembly 11 of this invention. The assembly 11 is composed of three parts, including a nut 13, a sleeve 15, and a pulling stem 17. Turning first to the nut portion 13 of the assembly 11, it is seen that the nut is internally threaded at 19 as shown particularly in FIG. 4. The outer wall 21 of the nut is cylindrically shaped and has a radial flange portion 23 formed adjacent its base portion 25. The outer circumference of the radial flange portion 23 may be knurled or have grooves scribed therein. The nut 13 is seated within the sleeve element 15 with the base 25 of the flange portion 23 seated on a peripheral ledge 27 formed within the sleeve. An end 29 of the sleeve is crimped radially inward over the flange portion 23 serving to lock the nut 13 within the sleeve. It would also be possible, of course, to form the nut and sleeve as one internal element.

The sleeve 15 has an intermediate thin wall portion 30 and terminates in a thicker walled area 31 at an opposite end 33 from the crimped end 29. The area 31 at the end 33 of the sleeve may have a frusto-conical circumference 35 tapering inwardly from end 33 and terminating in a cylindrical portion 37 to provide a flush installation. The total vertical dimension of the frusto-conical portion 35 and cylindrical section 37 is generally equivalent to the thickness of the work piece in which the element is to be inserted, as once again can be seen in FIG. 4.

The pulling stem 17 has a ring 39 integrally formed at the end thereof located within the sleeve 15. The ring portion 39 is seated on a ledge 41 formed on the inner wall of the sleeve below ledge portion 27 on which the nut 13 rests. The ledge 41, acting together with the ring 39, serves to lock the pulling stem within the sleeve element relative to the nut 13. The stem 17 has a peripheral notch 43 formed just below the ring portion 41 which serves to define the ring 41. Below the notched area 43, the stem is formed with a gradually reducing tapered outer circumference 45 which terminates in a straight wall portion 47 of the stem.

Figure 5:
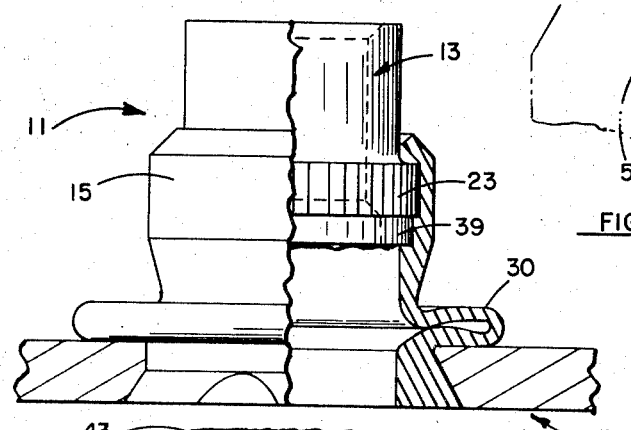
FIG. 5 is an elevational, partially sectioned pictorial representation of a fully installed nut member.
Figure 5:
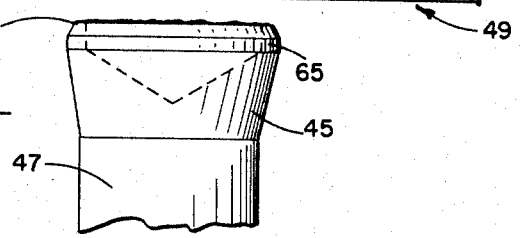

Turning to FIG. 4, it is seen that a work piece or surface 49 will have a hole 51 formed therein which is counterbored at 53 to accommodate the frusto-conically tapered portion 35 of the sleeve 15. The described nut assembly is suitable for blind hole applications in that it is inserted through the hole from side 55 of the work piece such that the nut portion 13 is disposed opposite of the surface 55. The sleeve 15 preferably is adapted to be received by the hole 51 of the work piece with close tolerances. The pulling stem 17 can have a threaded portion 57 which is gripped by a suitable tool 59 shown in outline in FIG 4. When the stem is pulled away from surface 55 in the direction of the arrow (FIG. 4), the thin wall portion 30 of the sleeve is first deformed adjacent the inner surface 57 of the work piece opposite surface 55. In other words, pulling the stem causes the thin wall portion 30 to bulge radially outwardly about and adjacent to surface 58, thus axially locking the sleeve portion 15 and nut 13 attached thereto relative to the work piece 49 since the work piece is sandwiched between the radially deformed portion 30 and the frusto-conical area 35 of the sleeve. When the wall 30 is crimped to its maximum as shown in FIG. 4, the load on the pulling stem is such that it will snap at the notched area 43 disengaging itself from the ring portion 39 (FIG. 5).

Figure 3:
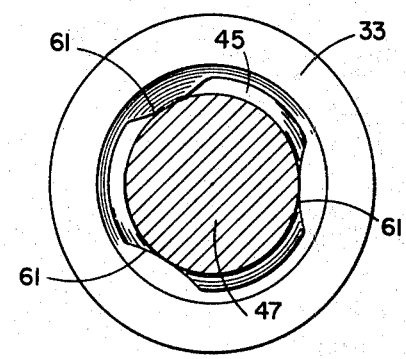
FIG. 3 is a sectional view taken along line 3—3 of FIG. 1.

Equidistantly spaced internal lobes 61 are integrally formed in the sleeve element about its generally circular inner circumference adjacent to the area 31 (FIGS. 1 and 3). The three lobes, 61, in effect present an effectively reduced diameter area to the pulling stem 17. When the pulling stem breaks at notched portion 43, the tapered portion 45 will engage inwardly and downwardly tapered top surfaces 63 of the lobes 61. The pulling stem 17 is formed of a high strength steel which will not be extruded by the lobe elements 61 but rather will force the lobe elements radially outward to a final inner diameter equivalent to the widest diameter 65 of the pulling stem, such that the resulting sleeve portion will have an essentially constant inner diameter as seen in FIG. 5. The enlarged portion 45 of the pulling stem forces the material of the lobes 61 to flow outward, as indicated, expanding the sleeve in this area and increasing the tightness of the grip of the sleeve on the work piece 49 preventing the relative rotation of the sleeve to the work piece. The nut 13 will not rotate relative to the sleeve due to the aforementioned knurled portion 23 thereof being tightly gripped by the sleeve 15 when the end 29 of the sleeve is crimped as previously described. Thus, as can be seen in this embodiment, all rotational movement of the nut element is essentially eliminated.

Turning now to FIG. 6 there is seen an embodiment of the principle of the invention of a pulling stem together with inwardly protruding lobe members of a sleeve portion of a nut assembly used for a floating nut application and requiring access to both sides of the work piece. The device as seen in FIG. 6, can be referred to as a plate nut assembly 67 having a plate 69 which has a cylindrical sleeve portion 71 seated preferably to close tolerances within a hole 73 in a work piece 75. The inner diameter of the sleeve 71 has three spaced lobes 77 as seen in FIG. 8. Integrally formed with the sleeve 71, is a ring 79 of an increased outer diameter which is seated on a surface 81 of the work piece adjacent thereto, and serves as a bearing surface on the work piece 75. Two spaced apart arms 83, are integrally formed with the plate element and extend normally upward from the ring portion 79 away from the surface 81 of the work piece. The arms 83 are preferably spaced 180° apart from each other, terminating in outwardly extending tabs 85 formed normally thereto with the tab portions 85 extending radially outwardly relative to the ring portion 79.

A separate nut element 87 is internally threaded at 89 to receive a suitable fastener. The nut 87 has an outer cylindrical wall portion 91 with an integrally formed flat base 93. In the area 95 above the base, the outer cylindrical wall 91 may bulge slightly outwardly to an increased diameter providing an internal counterbore. The flat base 93 has two opposite U-shaped recesses 97 (FIG. 7) formed therein such that the recesses accommodate the arms 83 of the plate element therebetween. The distance $a$ between the recesses 97, is less than the distance $b$ between the upperly extending arms 83, thus allowing the base 93 to slide relative to the plate element 69 between the two arms, which in effect become stops for movement of the base 93 of the nut. The width of the U-shaped recesses 97 is also greater than the width of the arms 83 allowing the nut to move in a direction parallel to the arms 83. Further, due to this arrangement, the nut 87 can rotate about the fixed plate element 69 until the sides of the U-shaped recesses 97 contact the arms 83. This arrangement of a floating nut element is relatively conventional in the art.

A retaining ring 99 of wire is snapped in place around the outer surfaces 103 of the arms 83 overlying the base 93 of the nut element. The retaining ring is thus sandwiched between the base 93 and the outward extending tabular portions 85 of the arms 83 as seen particularly in FIG. 6, thus locking the nut to the plate in sliding engagement.

Disposed within the plate element is a pulling stem 105 having a gradually tapered outer surface 107 thereon seated within the sleeve portion 71 of the plate element. The base 109 of the stem where the diameter is the greatest, is approximately equivalent to the diameter of the internal surface 110 of the sleeve portion in the area not having the inwardly protruding lobes 77. Thus, when the stem 105 is pulled through the element as seen in FIG. 9, the lobes 77 are forced outwardly to a position 111 shown in FIG. 10 tightly interlocking with the work piece 75. This provides such a tight lock that the plate 69 will not move or rotate relative to the work piece. Again, the material of the work piece in the area of the expanded lobes is cold worked which increases and improves the fatigue strength of the work piece.

Figure 11:
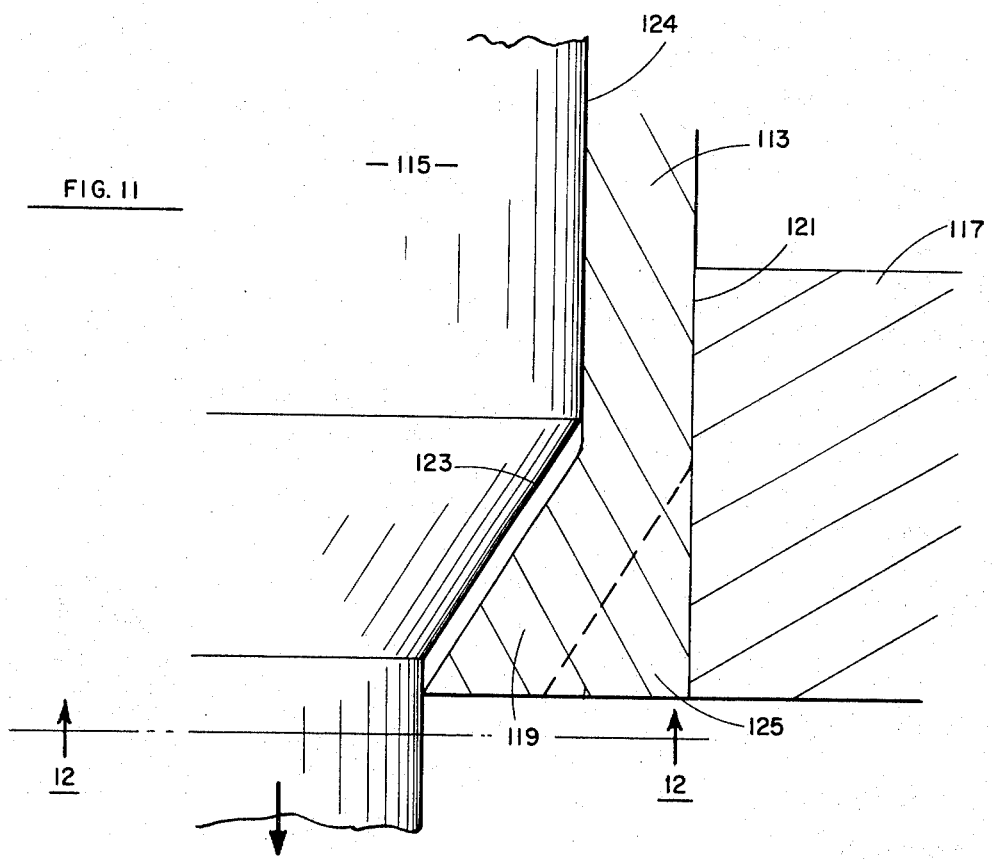
FIG. 11 is an elevational, partially sectioned view of an embodiment of a portion of a sleeve and pulling stem.
Figure 12:
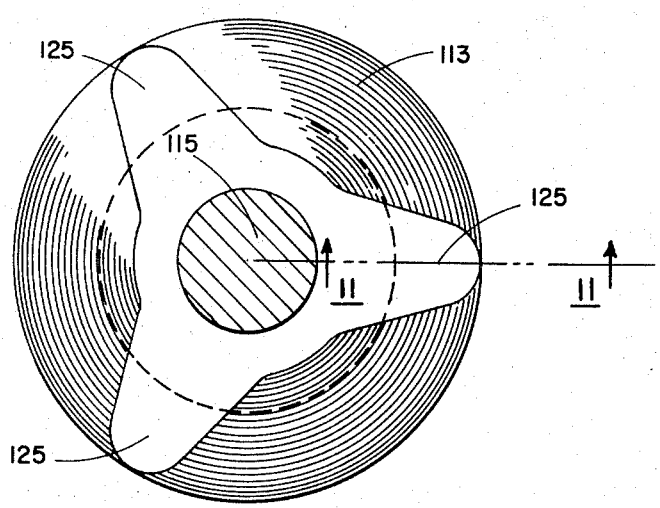
FIG. 12 is a sectional view taken along line 12—12 of FIG. 11.

Turning now to FIGS. 11 and 12, there is seen an embodiment of this invention where the lobes protrude from the outer circumference of the sleeve as compared to the previous embodiment where the lobes extend internally of the sleeve member of the nut assembly. Turning now to the figures, particularly, there is seen only a portion of the sleeve 113 and an associated pulling stem 115, together with an associated work piece 117. In the area of the work piece 117, the walls 119 of the sleeve 113 are frustro conically shaped tapering inwardly from a straight cylindrical section 121 which comprises the portion of the sleeve that engages a nut not shown. A likewise tapered section 123 is provided on the pulling stem such that when the stem is pulled in the direction of the arrow the portion 119 of the sleeve 113 will be forced to expand outwardly into the work piece 117 by the wall 124 of the stem.

Figure 2:
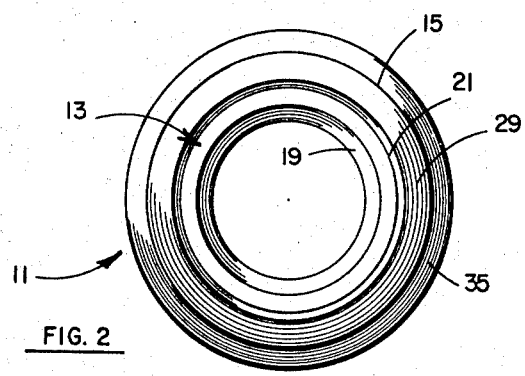
FIG. 2 is a top view of FIG. 1 taken along line 2—2 of FIG. 1.

As seen particularly in FIG. 12, the sleeve portion 113 has three lobes 125 equidistantly spaced about the portion 119 of the sleeve. Thus, the lobes 125 are in effect forced radially outwardly into the work piece 117 and serve as the main means of contact between the sleeve and the work piece when the pulling stem is pulled through. Thus, in this particular embodiment, the lobes on the sleeve are protruding radially outward as compared to the previous embodiments where the lobes are disposed on the inner circumference of the sleeve portion. The above described embodiment of the invention having outwardly projecting lobes can be used either in the nut assembly of FIG. 1 or the floating type nut assembly of FIG. 2.

I claim:

1. A hollow nut assembly for engagement with a work piece having a receiving hole therethrough comprising:

an internally threaded nut,
   a deformable sleeve affixed at one end thereof to said nut, having a generally circular cross section and extending away from said nut terminating in an opposite end,
   at least three radially projecting lobes integrally formed about the circumference of said sleeve adjacent said opposite end thereof,
   an internal portion of said sleeve extending axially and radially inward at said opposite end thereby defining an inclined surface end,
   a pulling stem disposed in said sleeve and extending from said opposite end, said stem having an inclined surface for cooperation with the inclined surface on said sleeve portion and having an outer diameter sufficient to cause expansion of said sleeve portion and said radially projecting lobes pulled through said sleeve from adjacent said nut to said opposite end of said sleeve.

2. The nut assembly of claim 1 wherein:
   said sleeve is elongated having the said one end rigidly affixed to said nut.

3. The nut assembly of claim 1 wherein:
   the length of said sleeve portion exceeds the depth of the hole in the work piece.

4. The nut assembly of claim 2 wherein:
   said nut has a radial flange formed adjacent said opposite end thereof,
   and a portion of said sleeve adjacent the said one end thereof surrounds and is crimped over said flange to secure said nut to said sleeve.

5. The nut assembly of claim 1 wherein:
   said lobes are formed about the outer circumference of said sleeve and extend radially outward therefrom,
   said sleeve at said one end thereof being generally tapered in configuration enlarging from a smaller diameter at that end of said sleeve to a greater diameter.

6. The nut assembly of claim 1 wherein:
   said stem has one end thereof rigidly secured in axial direction within said sleeve.

7. The nut assembly of claim 1 wherein:
   the end of said stem secured in said sleeve is a ring portion of enlarged diameter seated on a peripheral ledge formed on an inner wall of said sleeve.

8. The nut assembly of claim 7 wherein:

the stem has a peripheral groove therein adjacent said end ring portion, whereby said stem will break at a predetermined load at said groove when pulled through said sleeve.

9. The nut assembly of claim 1 wherein:

said nut element is slidably affixed to said sleeve.

10. The nut assembly of claim 9 wherein:

said nut has a generally flat enlarged base portion, said opposite end of said sleeve is insertable in said hole, said sleeve including a radial flange portion at the said one end thereof, said assembly including means for securing the base of said nut in sliding engagement with the flange portion of said sleeve.

11. The nut assembly of claim 1 wherein:

said lobes are formed about the inner circumference of said sleeve and extend radially inwardly therefrom to form the portion of said sleeve extending radially inward at said opposite end, the remaining portion of said sleeve at that end being generally circular.

12. The nut assembly of claim 11 wherein:

said sleeve is elongated, the outer surface of said sleeve at said opposite end is frusto conical reducing from a larger diameter at that end to a lesser outer diameter, and the said one end of said sleeve is rigidly affixed to said nut.

* * * * *

PO-1050
(5/69)

UNITED STATES PATENT OFFICE
CERTIFICATE OF CORRECTION

Patent No. 3,698,278      Dated October 17, 1972

Inventor(s) William H. Trembley

It is certified that error appears in the above-identified patent and that said Letters Patent are hereby corrected as shown below:

Column 6, Line 29:    After "surface" delete the word ---end---

Line 36:    After "lobes" at the end of the line insert the word ---when---.

Signed and sealed this 13th day of March 1973.

(SEAL)
Attest:

EDWARD M. FLETCHER, JR.
Attesting Officer

ROBERT GOTTSCHALK
Commissioner of Patents